United States Patent
Schulz et al.

(10) Patent No.: US 6,359,413 B1
(45) Date of Patent: Mar. 19, 2002

(54) CURRENT CONTROL SYSTEM FOR A SWITCHED RELUCTANCE MOTOR

(75) Inventors: Steven E. Schulz, Redondo Beach; Khwaja M. Rahman, Torrance, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/560,339

(22) Filed: Apr. 28, 2000

(51) Int. Cl.[7] .............................................. H02P 7/00
(52) U.S. Cl. ....................... 318/701; 318/254; 318/439; 318/801
(58) Field of Search ................................ 318/254, 439, 318/701, 801

(56) References Cited

U.S. PATENT DOCUMENTS 5,585,708 A    12/1996  Richardson et al. ........ 318/800
5,675,231 A  * 10/1997  Becerra et al. .............. 318/801
5,767,638 A  *  6/1998  Wu et al. ..................... 318/254

OTHER PUBLICATIONS

H.K. Bae and R. Krishnan, A Study of Current Controllers and Development of a Novel Current Controller for High Performance SRM Drives, Industry Applications Conference Proceedings, 1996, vol. 1, p. 68–75.

* cited by examiner

Primary Examiner—Marlon T. Fletcher
Assistant Examiner—Rita Leykin
(74) Attorney, Agent, or Firm—Cary W. Brooks

(57) ABSTRACT

A current control system for a switched reluctance motor that eliminates the effects of back EMF produced by such motor on the current control loop. The control system includes a current regulator that receives a current reference signal indicative of the desired output of the motor and a motor current signal indicative of the current in at least one phase winding of the motor. The regulator produces an output signal in response to the difference between the current reference signal and the motor current signal. The output of the regulator is a duty cycle command. A back EMF decoupler provides a back EMF signal indicative of the back EMF created by the motor and adds the back EMF signal to the current regulator output signal to provide a back EMF decoupled duty cycle command signal. An inverter circuit switches on and off the voltage to at least one phase winding of the motor in accordance with the back EMF decoupled duty cycle command signal to control the motor current and operate the motor.

8 Claims, 4 Drawing Sheets

CURRENT CONTROL SYSTEM FOR A SWITCHED RELUCTANCE MOTOR

TECHNICAL FIELD

This invention relates to current control systems for switched reluctance motors and, more particularly, to a current control system for a switched reluctance motor that eliminates the unwanted effects of back EMF.

BACKGROUND OF THE INVENTION

It is well known in the art of switched reluctance motors (SRM) to control such motors by controlling the current supplied to the motor. Two main types of current regulators have been used to control the motor current, hysteretic current regulators and low performance proportional and integral (PI) current regulators.

The hysteretic regulators are the most common, but have several drawbacks. They are typically variable frequency, which can cause electromagnetic interference (EMI) or acoustic noise problems. To prevent such problems, the maximum switching frequency is limited to prevent excessive switching losses in the inverter. Another drawback is that the hysteretic regulator is usually implemented using discrete analog circuitry which increases part count, cost and reduces reliability compared to a fully digital microcontroller or digital signal processor (DSP) based implementation. The hysteretic regulator may be implemented digitally, with either a microcontroller/DSP or high speed digital logic circuits. However, these implementations require a high sample rate to achieve adequate performance, which increases the cost of the hardware.

Low performance PI current regulators have also been used, in either digital or analog implementations. Their advantages over hysteretic regulators arc their fixed switching frequency and ease of digital implementation. There are several drawbacks when using a PI current regulator with a SRM. It is difficult to obtain a good performance of the PI current regulator because of the non-sinusoidal nature of the SRM, which prevents the use of a synchronous frame to regulate the current. Further, the highly non-linear nature of the machine operation makes the design of the PI regulator difficult. The back EMF of the motor, which is non-sinusoidal and non-linear with the rotor position and current, acts as a disturbance to the current loop. To adequately reject the back EMF disturbance, the PI regulator gains must be increased which may cause stability problems.

However, a third type of controller has been designed to overcome this problem. It is called a hybrid current controller. The controller performs as a fixed frequency PI regulator when the current error is small and transforms to hysteretic control when the error exceeds some predefined threshold. The controller implements a simplified back EMF decoupling technique which attempts to eliminate the effects of the back EMF of the motor. A drawback of this combination of hybrid controller and decoupling technique is that it may be only adequate as long as the hysteretic controller is there to catch any errors that the partially decoupled PI regulator could not eliminate.

Another drawback, as mentioned above, is that to implement the hysteretic controller digitally, a high sample rate is required to achieve adequate performance. Further, the back EMF decoupling technique uses a simple model of the back EMF which may not be adequate to model most SR motors. The SR motor must be operated deep into saturation in order to achieve maximal torque output for a given machine size and weight.

The back EMF calculation used in the technique models the machine inductance as a piecewise linear inductance. The derivative of inductance with respect to rotor position is then approximated as a constant in the regions of increasing and decreasing inductance, and zero elsewhere. The result is that between the unaligned and aligned positions of the rotor, a single value of $\partial L/\partial \theta$ is used. The same value is used in the motor torque and braking torque regions, but with opposite signs. Finally, the back EMF is calculated as:

$$e = \frac{\partial L}{\partial \theta} \cdot \omega \cdot i$$

This simplified back EMF calculation may result in significant errors if used on highly saturated machines. It is then up to the hysteretic controller to catch and control these errors. It would be preferable to have a complete stand alone decoupled PI current regulator that could provide sufficient current regulation without relying on a hysteretic controller to compensate for deficiencies in the PI current regulator.

SUMMARY OF THE INVENTION

The present invention provides a current control system for a switched reluctance motor that allows the use of a fixed frequency PI current regulator while achieving a good performance and current command tracking. The control system includes a current regulator that receives a current reference signal indicative of the desired output of the motor and a motor current signal indicative of the actual current in at least one phase winding of the motor. The regulator produces an output signal in response to the difference between the current reference signal and the motor current signal. The output of the PI regulator is a duty cycle command. A back EMF decoupler provides a back EMF signal indicative of the back EMF created by the motor and adds the back EMF signal to the PI regulator output to provide a back EMF decoupled duty cycle command signal which is fed to an inverter circuit. The inverter circuit switches on and off the voltage applied to at least one phase winding of the motor in accordance with the back EMF decoupled duty cycle command signal to regulate the motor current and operate the motor.

In one embodiment of the present invention, the back EMF signal is determined as a function of current, rotor position and rotor speed. The back EMF signal has a duty cycle which varies depending on the type of chopping used. For soft chopping, the back EMF signal has a duty cycle equal to a calculated back EMF divided by a DC voltage supplied to the inverter circuit. For hard chopping, the back EMF signal has a duty cycle equal to a sum of a calculated back EMF and the DC voltage, the sum divided by twice the DC voltage. The calculated back EMF is equal to the partial derivative taken at constant current of the phase flux linkage with respect to the rotor position times the rotor speed.

The control system of the present invention eliminates the effects of the back EMF of the motor on the PI regulator by adding the back EMF to the current loop. This reduces the bandwidth requirement of the current regulator to achieve a specified performance or command tracking.

These and other features and advantages of the invention will be more fully understood from the following description of certain specific embodiments of the invention taken together with the accompanying drawings.

DESCRIPTION OF THE PREFERRED EMBODIMENT

Figure 1:
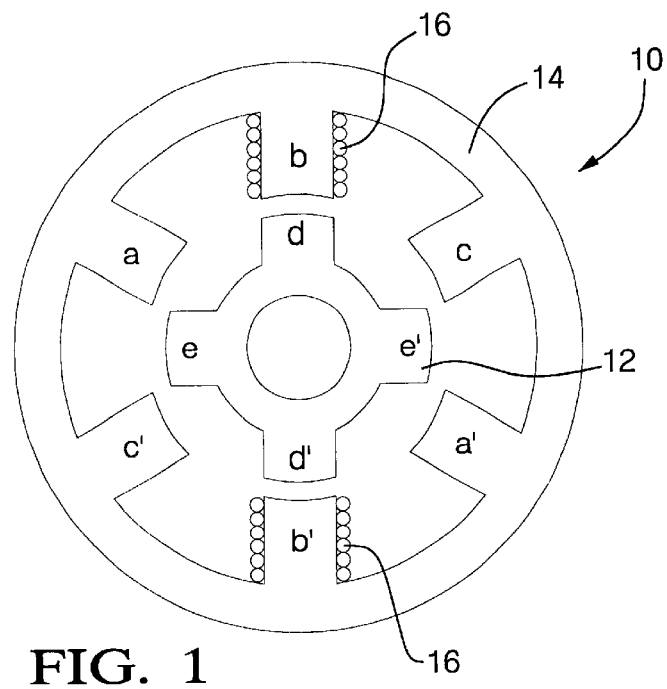
FIG. 1 is a cross-sectional view of a switched reluctance motor.

Referring now to FIG. 1 of the drawings in detail, numeral 10 generally indicates a three-phase switched reluctance motor having six stator poles and four rotor poles; however, the present invention may be applicable to various types of switched reluctance motors. The motor 10 includes a rotor 12 rotatable within a stationary stator 14. Stator 14 is provided with three pairs of diametrically opposite salient stator poles a–a', b–b', c–c'. Rotor 12 has two pairs of diametrically opposite salient poles d–d' and e–e'. The opposite poles of each stator pole pair share a common winding and define a respective stator phase. A winding 16 is wound about stator poles b–b', similar windings are provided for each of the other stator pole pairs.

Torque in the motor 10 is produced by the tendency of the rotor 12 to move to a position where the inductance of the windings is maximized. During motor operation, each stator phase is excited when its inductance is increasing, and unexcited when its inductance is decreasing. The magnetic reluctance of the flux is at its lowest when a rotor pole is exactly aligned with a stator pole and highest at an unaligned position. Thus, when for a given phase the rotor 12 is not aligned with the stator 14, the rotor 12 will start to move to align with the excited stator pole.

To rotate the rotor 12, current is switched on and off in each stator phase winding in a predetermined sequence synchronized with the rotor position. The direction of rotation is independent of the direction of current flowing through the phase winding; it only depends on the sequence of the stator winding excitation. To effectively operate the machine, the magnitude and the duration of the current flowing in the stator windings is controlled.

Figure 2:
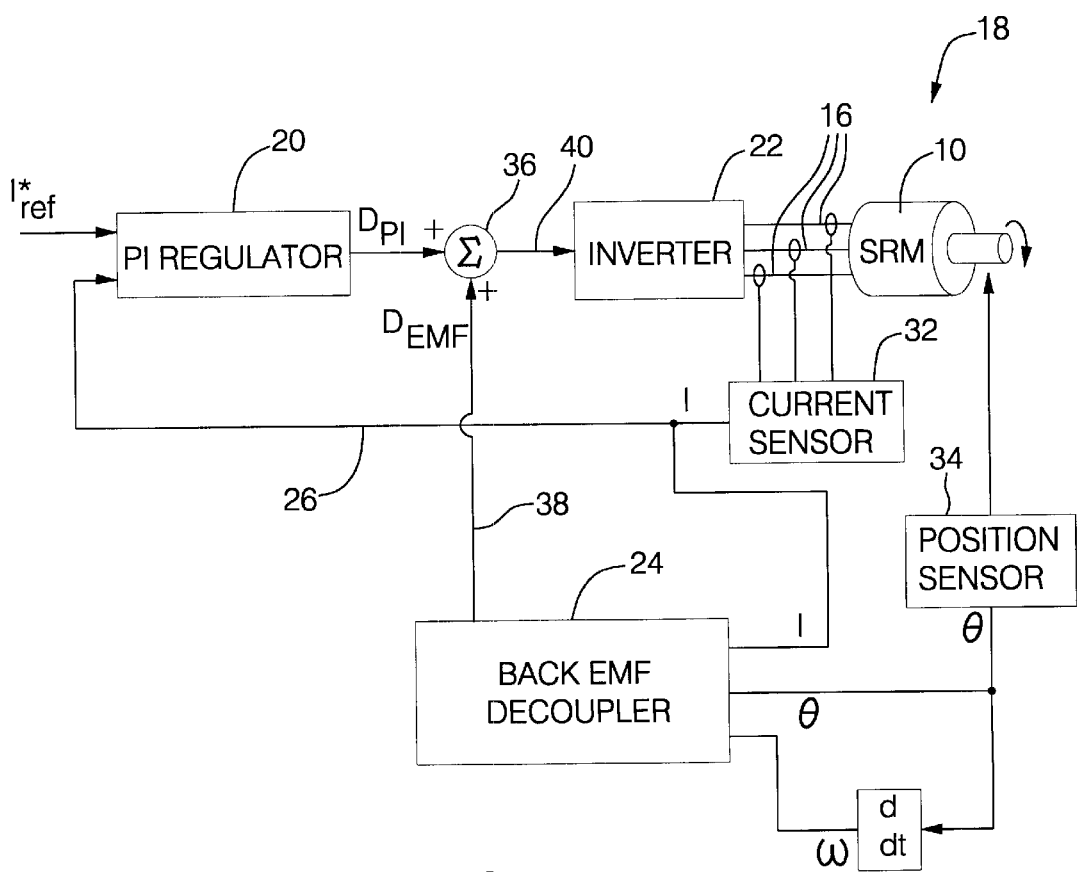
FIG. 2 is a block diagram of a current control system for a switch reluctance motor in accordance with the present invention.
Figure 3:
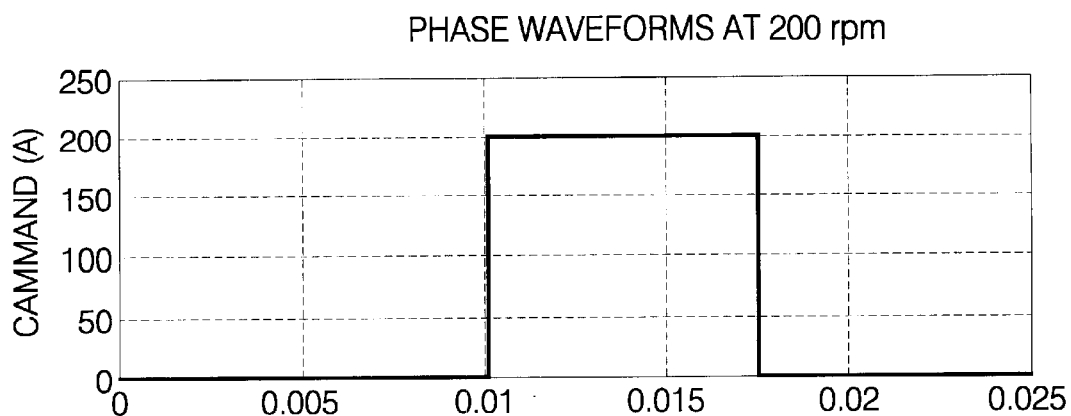
FIG. 3 is a graph of a current reference signal used to control a switched reluctance motor.

FIG. 2 illustrates a current control system 18 for the switched reluctance motor 10. The system 18 generally includes a current regulator 20, an inverter circuit 22 and a back EMF decoupler 24. The current flowing into the windings is controlled using an inner control loop 26 with a current feedback. The current regulator 20 is included in the inner control loop 26 to force the motor current to follow a current reference signal, $I_{ref}$ which may be a square wave signal generated by a microprocessor or digital signal processor (DSP) (not shown). The microprocessor determines the reference signal $I_{ref}$ in accordance with the torque command, position and speed of the machine. The reference signal $I_{ref}$ generated by the microprocessor may be a square wave as shown in FIG. 3. The current regulator is preferably a proportional and integral (PI) current regulator having a fixed frequency that may be implemented by the microprocessor or DSP.

Figure 4:
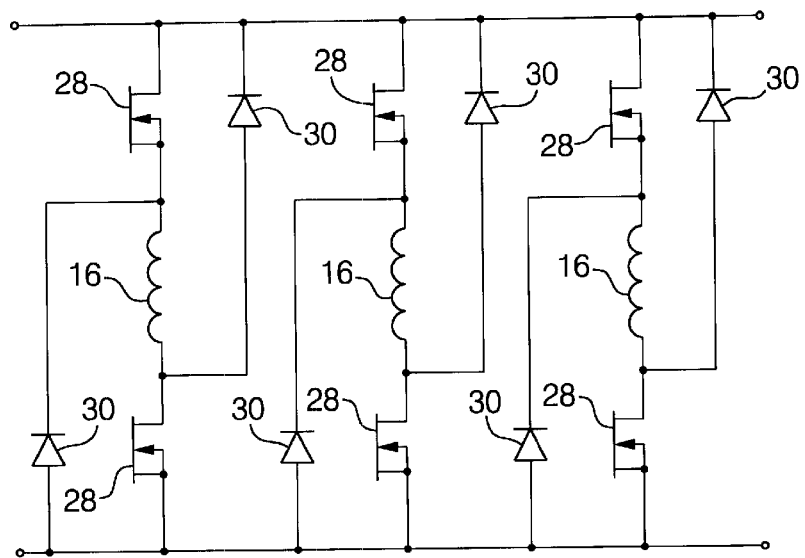
FIG. 4. is a circuit diagram for an inverter circuit used to control a switched reluctance motor.

As stated above, the rotor rotation is produced by switching current on and off in each stator phase winding 16 in a predetermined sequence synchronized with angular position of the rotor 12, $I_{ref}$ provides the manner in which the current will be switched on and off. The inverter circuit 22 controls the manner in which the current is applied to the stator phase windings 16. The inverter circuit 22 may include a series of six transistor power switches 28 and current feedback diodes 30 as shown in FIG. 4. The transistors are turned on and off by a duty cycle command signal from the current regulator and the diodes carry the current applied to the windings 16 of each phase during the transistor off time.

The motor current is fed back into the current regulator 20 via control loop 26 to compare the current reference signal $I_{ref}$ with the motor current. The motor current is measured by a current sensor 32 that is connected to each phase winding 16. The difference between the current reference signal $I_{ref}$ and the motor current signal is used to generate a current regulator output signal that compensates for the difference between the current reference signal and motor current.

Figure 5:
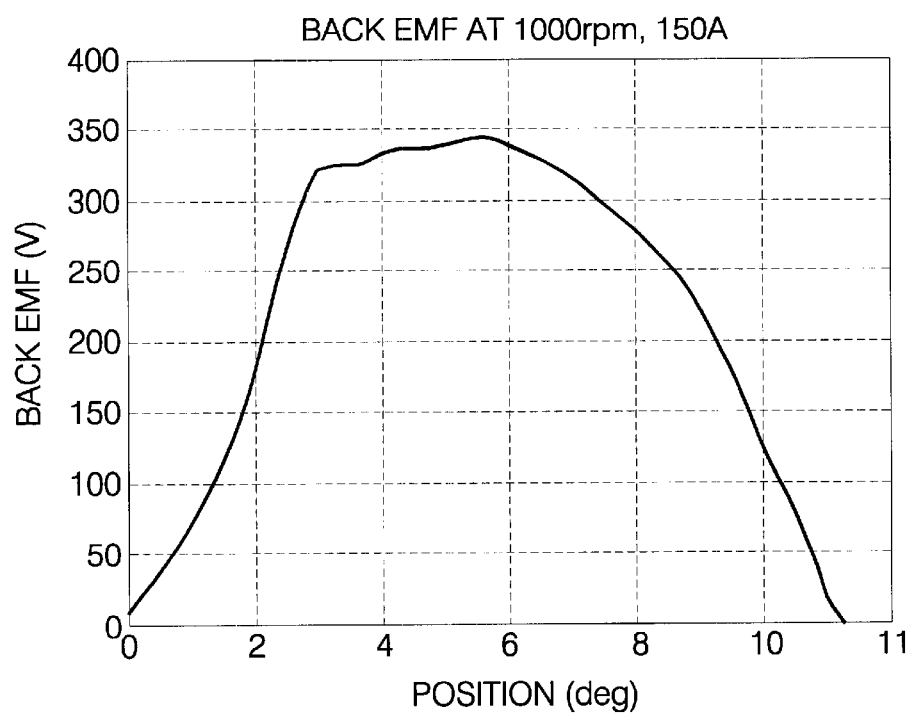
FIG. 5 is a graph of a back EMF signal generated by a switched reluctance motor.
Figure 6:
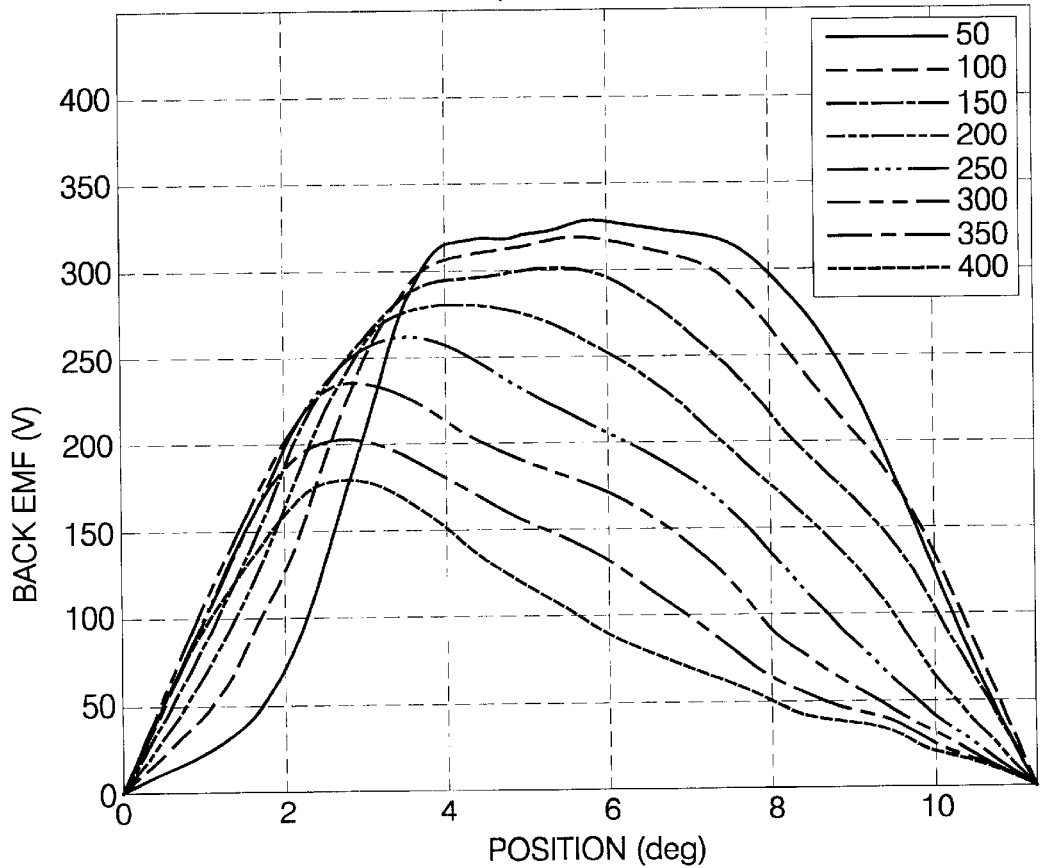
FIG. 6 is a graph of the back EMF created by the motor versus motor current and position of the rotor.

The current regulation may be disturbed by the back EMF created by the SR motor in the phase windings and compensation must be made for the disturbance. FIG. 5 illustrates a typical back EMF profile, the back EMF is highly non-linear, and has a sharp rising edge. The back EMF is also greatly changed by the magnitude of the current as shown in FIG. 6. To eliminate the back EMF disturbance, the back EMF is decoupled from the current regulator at the output of the current regulator 20 before it is fed into the inverter circuit 22.

The back EMF is decoupled from the current regulator by adding a back EMF signal to the output signal of the current regulator 20. The microprocessor may generate the back EMF signal by using a two-dimensional look-up table. The look-up table may be derived from finite element analysis simulation or from off-line measurements. For example, the back EM F may be derived as a function of phase current, rotor position and rotor speed. The following equations may be used to calculate the back EMF:

$$e = \frac{\partial \psi}{\partial \theta} \cdot \omega$$

$$\frac{\partial \psi}{\partial \theta} = f(i, \theta)$$

$\psi$ is the phase flux linkage, $\theta$ is the rotor position, and $\omega$ is the rotor speed. The processor receives the measured phase current and the rotor position and uses the two-dimensional look-up table to obtain the $\partial \psi / \partial \theta$ term. Interpolation may be used when the inputs do not fall precisely at the pre-generated points. The rotor speed may be calculated either from a position sensor output 34 or directly from a speed transducer.

Once the back EMF voltage has been calculated, the duty cycle required to compensate for this voltage is determined. The required duty cycle will depend on the DC bus voltage, the type of chopping used to control the current such as hard or soft chopping and the inverter voltage gain. For a pulse width modulation inverter the following equations are used:

$$D_{EMF} = \frac{e + V_{DC}}{2 \cdot V_{DC}}$$

$$D_{EMF} = \frac{e}{V_{DC}}$$

Figure 7:
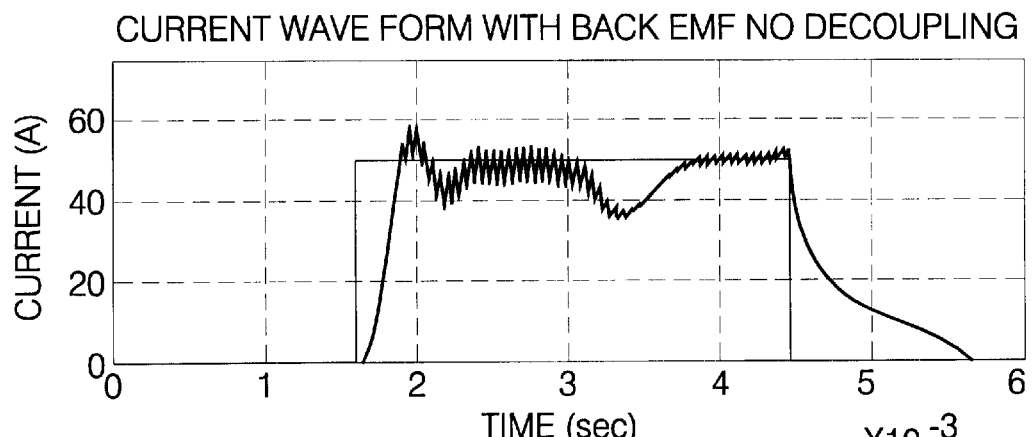
FIG. 7 is a waveform of a current signal without back EMF decoupling the back EMF from the signal.
Figure 8:
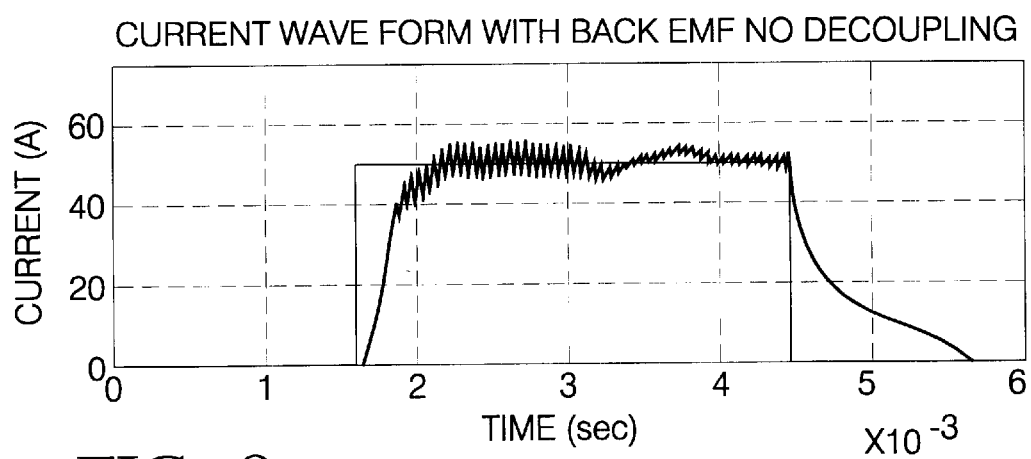
FIG. 8 is a waveform of a current signal with back EMF decoupling from the signal in accordance with the present invention.

The back EMF signal is fed to a summing element 36 via signal line 38, where it is added to the PI regulator output signal to provide a back EMF decoupled duty cycle command signal. The duty cycle command signal is then fed to the PWM inverter via signal line 40. If the calculation for back EMF is performed correctly, the PI regulator will not have to react at all to reject the back EMF disturbance. With the back EMF decoupling, good current regulator performance may be achieved with a fixed frequency PI current regulator. Without the proposed decoupling, it is difficult to obtain good performance in a SR motor without increasing hardware cost and complexity. FIG. 7 illustrates a current waveform with no decoupling compared to the current reference signal and FIG. 8 illustrates a current waveform with back EMF decoupling compared to the current reference signal.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A current control system for a switched reluctance motor having a rotor defining a plurality of rotor poles, a stator defining a plurality of stator poles and at least one phase winding associated with at least one stator pole, said system comprising:

a current regulator for receiving a current reference signal indicative of the desired output of the motor and a motor current signal indicative of the current in at least one phase winding and for providing a output signal in response to a difference between the motor current and the current reference signal;

a back EMF decoupler for generating a back EMF signal indicative of back EMF created by the switched reluctance motor and adding said back EMF signal to the current regulator output signal and producing a back EMF decoupled duty cycle command signal;

an inverter circuit responsive to said back EMF decoupled duty cycle command signal for switching current in at least one phase winding on and off to rotate the rotor of the switched reluctance motor;

wherein said back EMF signal has a duty cycle equal to a sum of a calculated back EMF and a DC voltage supplied to the motor, said sum divided by twice said DC voltage; and wherein said calculated back EMF is equal to a partial derivative of a phase flux linkage with respect to a rotor position times a rotor speed.

2. A current control system of claim 1 wherein the inverter circuit is a pulse width modulation inverter circuit.

3. A current control system of claim 1 wherein the current regulator and back EMF decoupler are included in a microprocessor.

4. A current control method for a switched reluctance motor having a rotor defining a plurality of rotor poles, a stator defining a plurality of stator poles and at least one phase winding associated with at least one stator pole, said method comprising the steps of:

providing a current reference signal indicative of the desired output of the switched reluctance motor;

measuring a motor current in at least one phase winding for providing a motor current signal;

providing a current regulator to receive the current reference signal and motor current signal and to produce an output signal in response to the difference between the current reference signal and the motor current signal;

determining the back EMF of the switched reluctance motor for providing a back EMF signal;

adding the back EMF signal to the current regulator output signal for providing a duty cycle command signal;

switching on and off the desired phase voltage in accordance with the duty cycle command signal to regulate the current in at least one phase winding to rotate the rotor of the motor; and wherein determining the back EMF includes the steps of:

detecting the position and speed of the rotor;

determining the phase current;

finding a partial derivative of the phase flux linkage with respect to the rotor position; and multiplying the partial derivative by the rotor speed.

5. A current control method as in claim 4 wherein the back EMF signal has a duty cycle equal to the determined back EMF divided by a DC voltage supplied to the motor.

6. A current control method as in claim 4 wherein the back EMF signal has a duty cycle equal to a sum of the determined back EMF and a DC voltage supplied to the motor, the sum divided by twice said DC voltage.

7. A current control system for a switched reluctance motor having a rotor defining a plurality of rotor poles, a stator defining a plurality of stator poles and at least one phase winding associated with at least one stator pole, said system comprising:

a current regulator for receiving a current reference signal indicative of the desired output of the motor and a motor current signal indicative of the current in at least one phase winding and for providing a output signal in response to a difference between the motor current and the current reference signal;

a back EMF decoupler for generating a back EMF signal indicative of back EMF created by the switched reluctance motor and adding said back EMF signal to the current regulator output signal and producing a back EMF decoupled duty cycle command signal;

an inverter circuit responsive to said back EMF decoupled duty cycle command signal for switching current in at least one phase winding on and off to rotate the rotor of the switched reluctance motor; and wherein said back EMF signal has a duty cycle equal to a calculated back EMF divided by a DC voltage supplied to the inverter circuit.

8. A current control system of claim 7 wherein said calculated back EMF is equal to a partial derivative of a phase flux linkage with respect to a rotor position times a rotor speed.

* * * * *